April 17, 1973 C. H. CAROTHERS 3,728,254
METHOD AND APPARATUS FOR ECOLOGICAL RECYCLING OF WASTE PRODUCTS
TO PRODUCE FERTILIZER AND GARDEN PLANT NUTRIENTS
Filed Sept. 22, 1971 5 Sheets-Sheet 1

INVENTOR
CHARLES H. CAROTHERS

ATTORNEYS

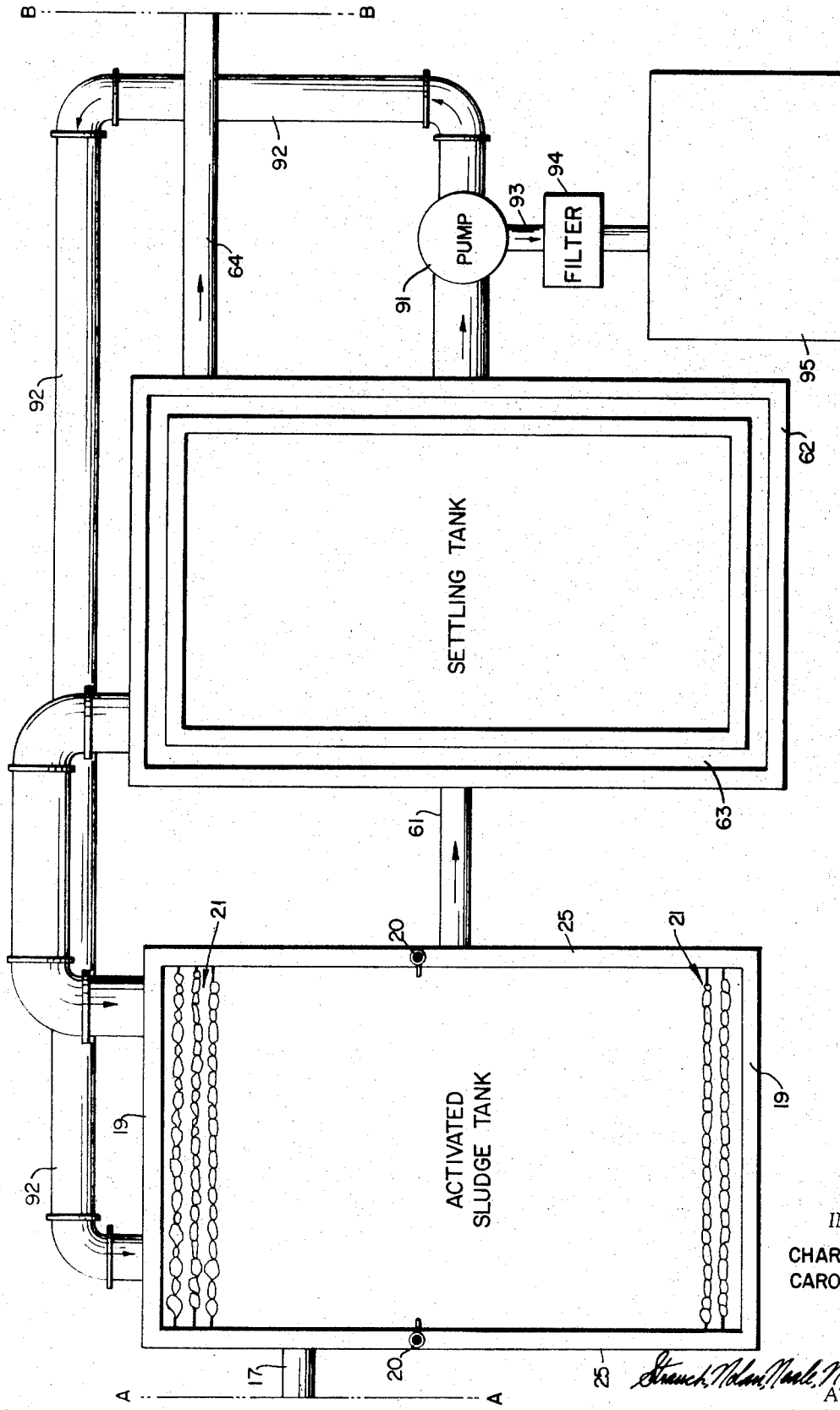
FIG. IB

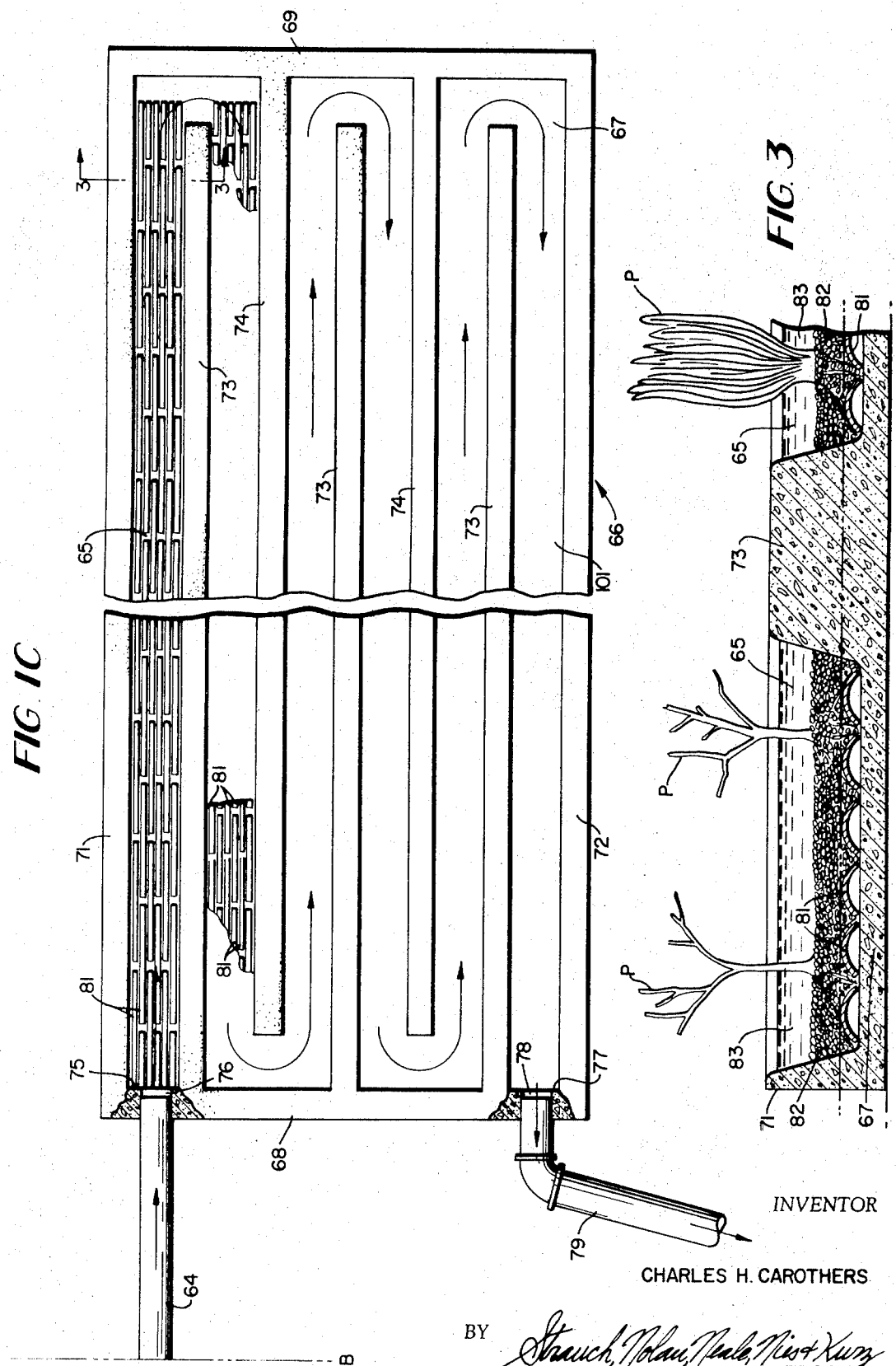

April 17, 1973 C. H. CAROTHERS 3,728,254
METHOD AND APPARATUS FOR ECOLOGICAL RECYCLING OF WASTE PRODUCTS
TO PRODUCE FERTILIZER AND GARDEN PLANT NUTRIENTS
Filed Sept. 22, 1971 5 Sheets-Sheet 4

INVENTOR
CHARLES H. CAROTHERS

BY *Branch, Nolan, Neale, Nies & Kurz*
ATTORNEYS

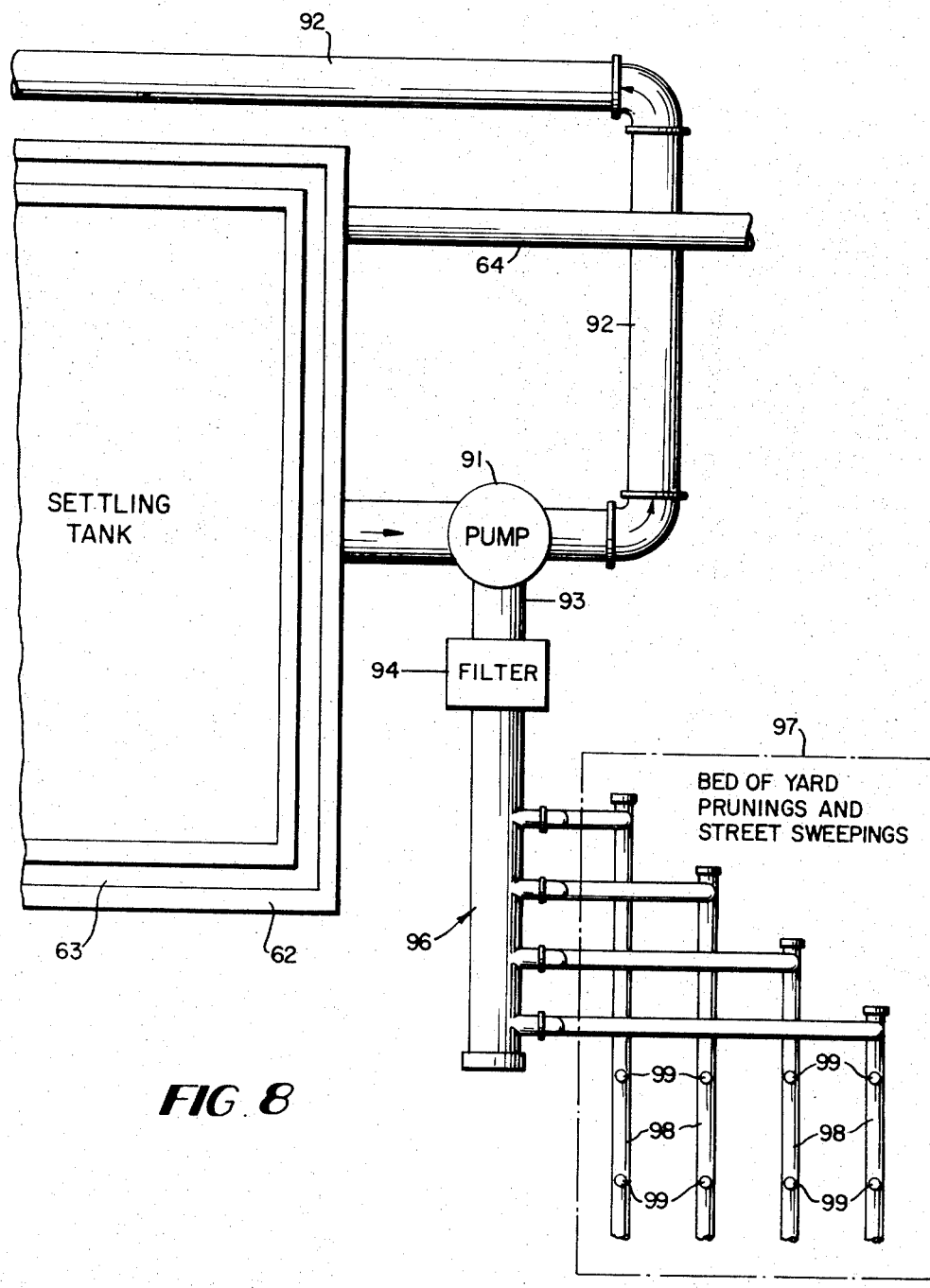

United States Patent Office 3,728,254
Patented Apr. 17, 1973

3,728,254
METHOD AND APPARATUS FOR ECOLOGICAL RECYCLING OF WASTE PRODUCTS TO PRODUCE FERTILIZER AND GARDEN PLANT NUTRIENTS
Charles H. Carothers, 51 Irving Place, Red Bank, N.J. 07701
Filed Sept. 22, 1971, Ser. No. 182,584
Int. Cl. C02c 1/10
U.S. Cl. 210—7
14 Claims

ABSTRACT OF THE DISCLOSURE

A method and apparatus for ecologically recycling household organic waste, yard and garden trimmings and prunings, and storm sewerage along with sanitary sewage through an activated sludge treatment process modified to increase its aeration efficiency while eliminating the need for preliminary sedimentation tanks, final sludge digester tanks and the utilization of the communities' natural water resources for the stabilization and the purification of the final effluent discharge by effecting on site utilization of the final effluent discharge through a separation of the sludge component and the nutrient rich liquid component for respectively forming dried commercial fertilizer and/or commercially saleable compost and reducing the nutrient rich liquor to nutrient free water by conveying it as a feeder liquor through a suitably formed hydroponic garden containing commercially saleable plants arranged to extract the nutrients. The apparatus, in addition to the conventionally fitted activated sludge aeration tanks and a final sedimentation tank, provides a grinding unit for grinding the household organic waste and yard and garden trimmings and introducing them at suitable strategic points into the sanitary sewer lines to be conveyed by the sewage effluent to the plant site and delivered, after passage through a mixer to provide thorough mixing, to the aeration sludge tank fitted with a supplemental aeration system which adds to the conventional activated-sludge process a "trickling filter effect" substantially enhancing the aeration and bacterial growth ability of the aeration tank, a sludge removal pump having an outlet alternately adapted to deliver excess sludge to a drier for conversion as an end product to commercial fertilizer or to a spray means for spraying the sludge as a composting catalyst over a chip bed produced by passing yard and garden prunings through a conventional chipper to produce as an end product a rich commercial compost, and a hydroponic garden for extracting the nutrients from the separated nutrient rich liquor to produce as an end product nutrient free water.

BACKGROUND OF THE INVENTION

The present invention relates to the improvement of urban waste disposal systems to increase the efficiency of the biochemical treatment facilities and utilizing such facilities for also treating household garbage, yard, street and garden organic trimmings, and storm sewer effluent. The invention assures as an end result, the recycling through profitable utilization of the nutrient present in such waste materials and a significant decrease in environmental pollution.

At the present time, it is customary to provide separate facilities for disposing of the variant waste products of urban communities, namely, household garbage, sanitary sewage, yard, street and garden trimmings, and storm sewage. Disposal facilities in general use at the present time contemplate recycling processes which produce as end products air and water pollutants detrimental to the environment. For example, incineration of household garbage, yard, street and garden trimmings results in stack gases which pollute the air and ash residues rich in carbon normally treated as a waste product consigned to landfills. Customary treatment of raw sanitary sewerage results in nutrient rich sludge and nutrient rich effluent which, for the most part, are handled as waste products respectively consigned for landfills and recycling into the communities' water resources. Such recycling of this effluent promotes the growth of algae and other marine plant life in the natural water supply sources with incident exhaustion of the oxygen rendering such supply sources unfit for either human consumption or recreational usage or to sustain fish life and other useful marine food products. Customary handling of storm sewage, generally contaminated by foreign matter washed into the sewer lines from the streets and surrounding ground areas, generally involves today a recycling of the contaminated storm water into the community water supply source without any treatment. As a consequence, further contamination of the water supply sources results.

As presently constructed, the sanitary sewerage treatment facilities are not designed to effectively utilize the end products which they produce nor are they capable of effectively treating either the storm drainage, which has a relatively low solids content, handling trucked household garbage and trash, because of its extremely high solids content, or handling the yard, street and garden trimmings, because of its high solids content. The present invention overcomes these deficiencies by suitable modification of the raw sewerage treatment methods and facilities of the prior art (1) to provide for an influent which comprises a mixture of raw sewage, household garbage, yard, street and garden trimmings, and/or storm drainage, (2) to provide an increased efficiency in the aeration equipment effecting biochemical decomposition of the organic solids of such waste materials, and (3) to a further handling of the waste sludge and effluent output of such facilities that permits commercially profitable utilization of the sludge and assures removal of substantially all nutrients from the effluent liquid before recycling into the community water supply sources.

SUMMARY OF THE INVENTION

It, accordingly, is a primary object of the invention to provide waste treatment methods and facilities for treating waste products produced in our modern day environment which will effectively convert the waste organic products into useful end products and to utilize these end products for enhancement of the environment.

A further important object of the present invention resides in the provision of a method for pretreating and thoroughly mixing the household garbage and trash, the organic yard, garden and street wastes, and raw sewerage and/or storm drainage free of foreign matter, such as bottles and cans, to form an influent which may be treated by highly efficient biochemical processing to digest the organic solids thereby producing nutrient rich sludge and nutrient rich effluent which may respectively be converted to fertilizer or used as a composting media and used as a natural plant food to promote the growth of commercially valuable plant life and provide as an end product substantially nutrient free potable water to be recycled into the environmental water resources.

Another object of the present invention resides in the provision of waste product treatment facilities comprising means for grinding household garbage and raw sewage influent, either alone or augmented by yard, garden or street trimmings, and storm drainage, together and thoroughly mixing them to provide an influent for biochemical sewage treatment means of an improved high efficiency through low cost supplementary aeration equipment, the provision of means for treating the resulting sludge and nutrient rich effluent to separate them for respective further processing (1) to conventionally convert portions of the sludge to commercially marketable fertilizer and the normally waste portions of the sludge as an agent for decomposing woody remnants of yard and garden trimmings to humus and (2) to utilize the nutrient rich discharge effluent as a natural plant food in a manner to produce an ultimate end product consisting of substantially nutrient free, potable water for recycling into the environmental water resources.

BRIEF DESCRIPTION OF THE DRAWINGS

Still further objects will appear from the following description and appended claims when read in conjunction with the accompanying drawings wherein:

FIGS. 1A, 1B and 1C constitute a three part schematic flow diagram depicting a treatment plant for carrying out the process of the present invention;

FIG. 3 is a fragmental cross sectional view taken substantially along line 3—3 of FIG. 1C to illustrate the manner in which the nutrient rich, liquid effluent component of the present invention is utilized to produce substantially nutrient free, potable water as an end product for recycling into the environmental water resources;

FIG. 8 is a fragmental schematic view of a modified sludge handling means employed at the discharge end of the flow diagram segment of FIG. 1B to utilize the waste sludge as a decomposing agent in reducing the woody remnants of the yard, street and garden trimmings to humus.

DESCRIPTION OF THE PREFERRED EMBODIMENT

Figure 1A:
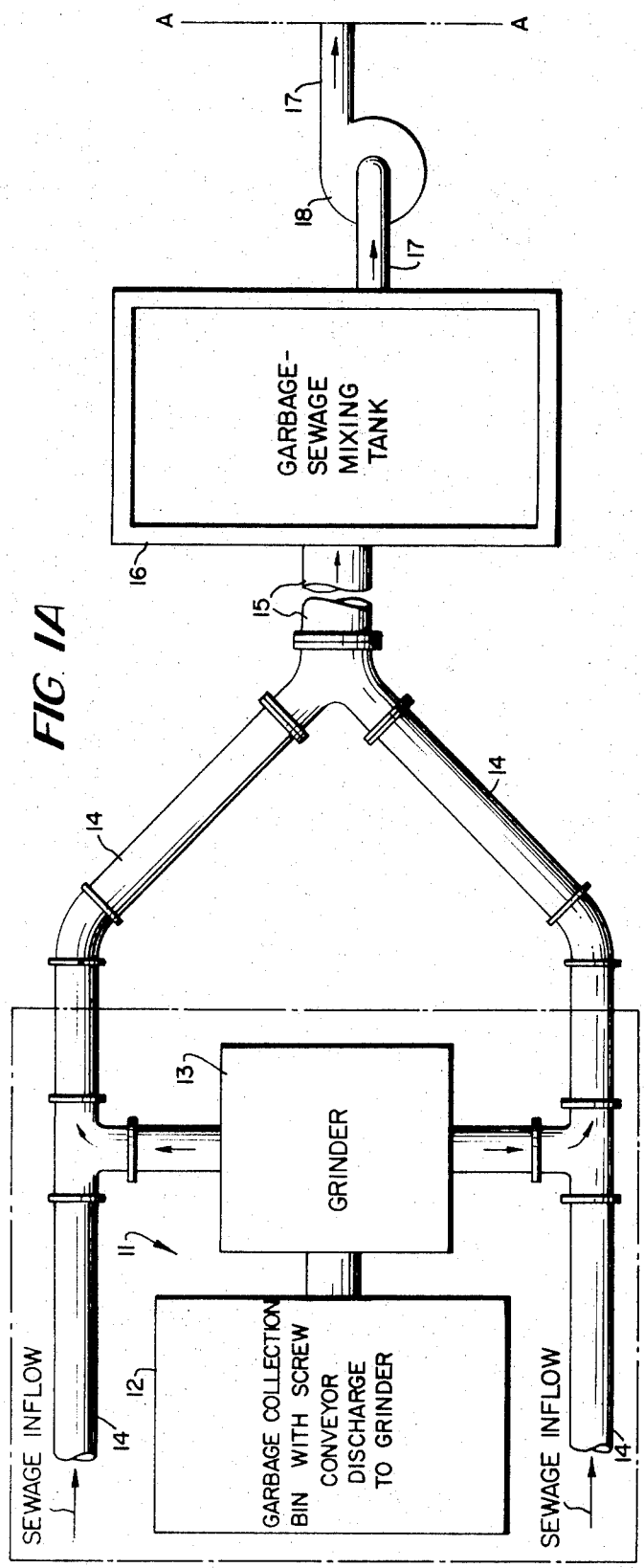
Figure 2:
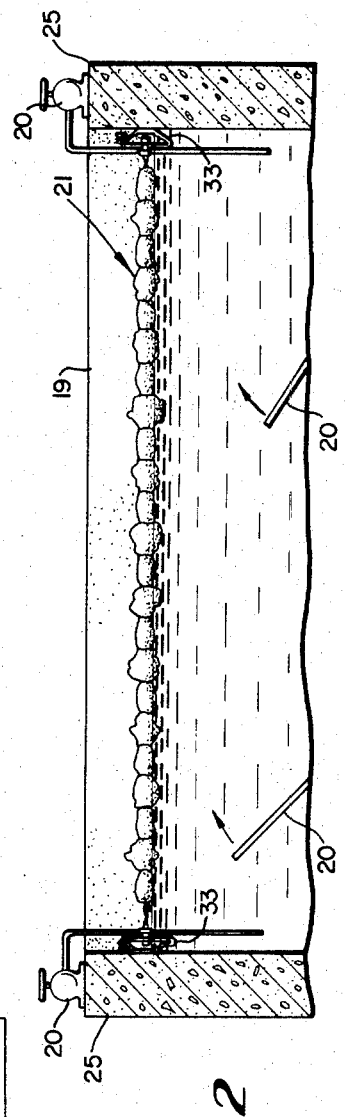
FIG. 2 is a fragmental cross sectional view taken substantially along line 3—3 of FIG. 1 to illustrate the supplementary aeration means provided by the present invention to increase the biochemical efficiency of the activated sludge tanks preferably employed in practicing the present invention.

With continued reference to the drawings wherein the same reference numerals are used throughout the several views to indicate the same parts, the treatment process of the present invention is preferably carried out utilizing modified activated-sludge sewage treatment facilities generally indicated by numeral 10 of FIGS. 1A, 1B and 1C. These facilities include the customary ancillary equipment such as screens, grit chambers and blowers, but the present invention eliminates the need for preliminary sedimentation tanks and digester tanks generally employed in conventional activated-sludge treatment facilities. According to this invention, the sewage treatment facilities provided are basically adapted to practice the aerobic decomposition principle of the well known activated-sludge process but at a significantly increased efficiency. It is further contemplated that the influent to be treated include solids from grinding and mixing together of household garbage, paper, and yard and garden clippings freed of glass bottles, cans and like foreign matter, and raw sanitary sewage alone or mixed with storm sewer drainage. Such a mix provides an influent having a high humus, carbon and cellulose content providing a high to medium demand for the acidic elements, such as nitrates and phosphorus, in the sanitary sewage, effecting removal of these elements and, after proper separation of the resulting effluent into its solid and liquid components, provides waste sludge ideally suited for drying and conversion into highly efficient commercial fertilizer or application as a catalytic agent to decompose wood chips, preferably produced at the plant site from yard and garden prunings and spread to form humus beds, and nutrient rich liquid plant food for hydroponic gardening which, after nurturing the garden plants, become substantially nutrient free water for safe recycling into environmental water sources. The principal requisite of the present invention, insofar as the sewage treatment process is concerned, is the capacity and efficiency of the process in effecting the biochemical decomposition of the decomposable matter.

Referring for the moment to FIGS. 1A, 1B and 1C, sewage treatment facilities comprise a grinder unit 11 for pretreating household garbage waste and yard and garden trimmings of either the kitchen type disposal units connected to the sanitary sewage lines and required by local ordinance or a screw conveyor receiving and grinder unit located at a trucking disposal site designed to receive household garbage, trash, and yard and garden trimmings freed of glass and plastic containers, cans and other metallic and like objects. This latter unit is required today where urban household wastes generally are collected by truck and trucked to a disposal site but could be dispensed with in the ideal situation where urban sanitary treatment systems are constructed according to this invention and operated under laws and regulations requiring all households to employ disposal units to grind garbage and other organic waste products and introduce the ground residue into the sanitary sewage flow lines to be conducted to the treating plant. This organic matter, being high in nitrogen and phosphates and subject to bacterial decomposition, provides a desirable additive to the normal sanitary sewage influent when it is intended to convert the excess waste sludge produced in the activated-sludge process by drying into commercial farm, garden and yard fertilizer.

When it is necessary to employ the receiving bin and grinding unit 11, these units can be installed either at strategic neighborhood locations, preferably, for example, at the sanitary sewage pumping stations normally scattered throughout the urban area being serviced to reduce trucking costs, or at the final treatment plant when the area served is not sufficiently large to warrant multiple unit installations. In either case, the combined unit 11 includes a hopper bin 12 having an underslung screw conveyor delivering to a grinder 13 of any conventional construction, preferably one providing solids particles screenable through screens having clear openings of the order of about ¾ to 1½ inches (see Sewage Treatment Works by Keefer, McGraw-Hill Book Co., Inc., First edition, 1940, page 314). The ground residue from grinder 13 is delivered into sanitary sewage branch pipelines 14 and conducted by the through flow therein into a charging inlet pipeline 15 leading to an open-top mixing tank 16 located at the final treatment plant and exposing the surface of its turbulent contents to the ambient air and light. In the case where the receiving bin and grinding unit 11 is located at a pumping station, the pipeline 15 will be the outlet line from the pumping stations leading to the final treatment plant and the branch lines 14 will be the sanitary sewer lines leading into the pumping station. In the case where the receiving bin and grinding unit 11 is located at the final treatment plant, the branch lines 14 will be the sanitary sewer lines leading into the final treatment plant and pipeline 15 will be the feeder inlet line of the plant's treating system. Mixing tank 16 may comprise any conventional paddle or other stirring type tank capable of thoroughly mixing and agitating the contents in a manner to incorporate into the slurry oxygen bearing atmospheric air to help satisfy the B.O.D. (biochemical oxygen demand) of the slurry. Preferably the slurry enters mixing tank 16 near the top and is discharged through outlet pipeline 17 from near the bottom of tank 16 containing a conventional sewage treatment plant pump 18, preferably of the non-clogging type generally referred to as a "Solids Pump."

The pump outlet section of pipeline 17 delivers the slurry into the bottom of a conventionally fitted activated-sludge tank 19 (FIG. 1B, sheet 2). The conventional fittings 20 of tank 19 are designed to aerate the slurry supplied to tank 19 by (1) mechanical aeration, (2) diffused air-aeration, or (3) a combination of mechanical and diffused aeration. Since these systems of aeration are conventional and well known in the art, illustration and detailed description of the suitable structure at this point are not deemed necessary. It will, it is believed, be sufficient to point out that diffused aeration, the most widely used method, is preferred and that all three methods of aeration involve circulating and agitation of the sewage to continually bring new surfaces of the liquid into contact with the atmosphere resulting in absorption of oxygen from the atmosphere as explained at pages 315 to 326 of the aforementioned edition of Sewage Treatment Works by Keefer. Also diffused aeration as well as a combination of diffused aeration and mechanical aeration additionally involves the introduction of compressed air into the tank, preferably near the bottom, so air bubbles will rise in the liquid providing oxygen for absorption. Since the absorbed oxygen provides positive oxidation throughout the stirred sewage mix in the tank, decomposition by aerobic bacteria and biochemical changes results.

Figure 4:
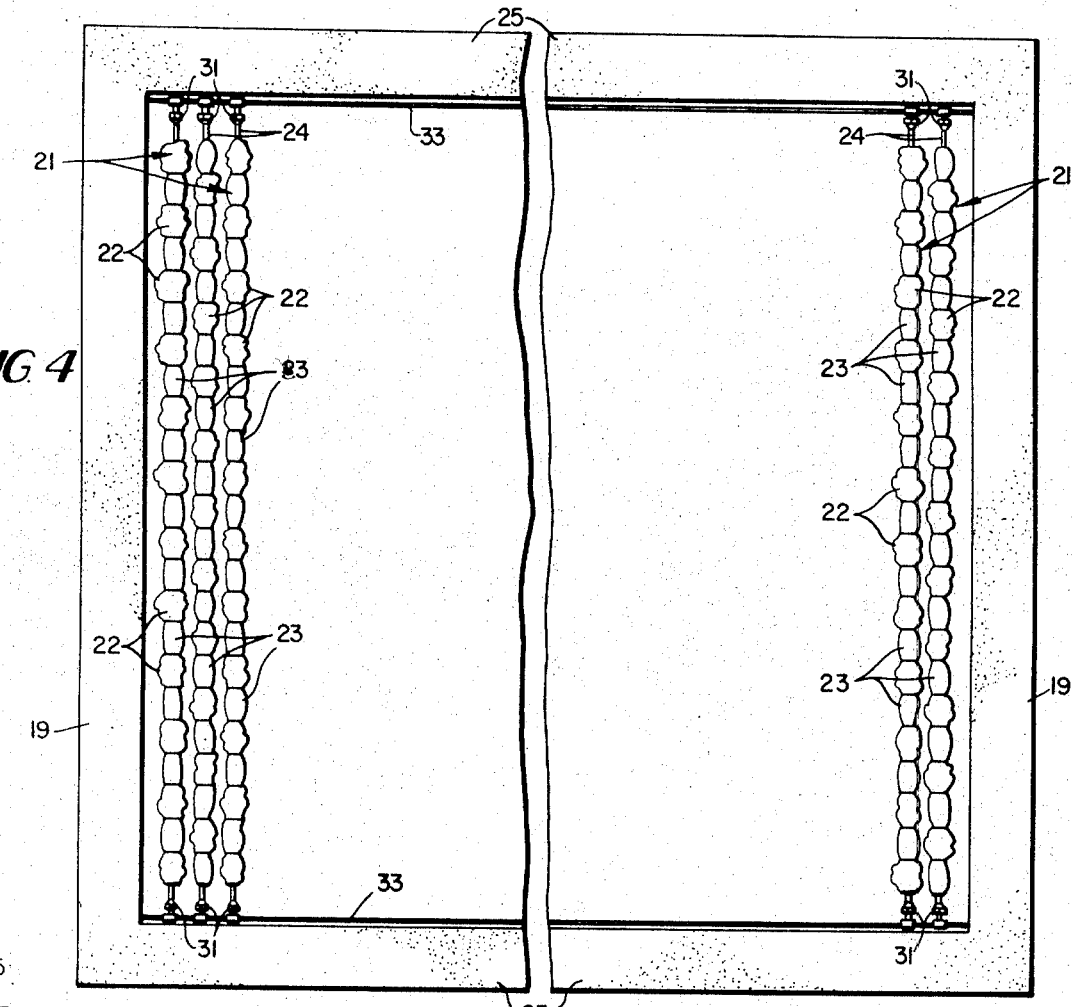
FIG. 4 is a plan view on an enlarged scale of an activated sludge tank provided by this invention with supplementary aeration equipment to increase the efficiency of the biochemical treatment of such sludge tanks.

The present invention contemplates not only employment of this conventional aeration but a further aeration of the tank mix by what is here referred to as a "Supplementary Aeration System." This comprises flotation assemblies 21 (FIG. 1B, sheet 2 and FIGS. 2, 4, 5, 6 and 7). This supplementary aeration system adds to the conventional activated-sludge process a "trickling filter effect," a treatment recognized as being "accomplished by many complex physical and biochemical processes" (see Sewage Treatment Works by Keefer, McGraw-Hill Book Co., First edition, 1940, page 264). Each flotation assembly 21 comprises a string-like assembly comprising a multiplicity of porous body elements 22 (FIG. 4) freely rotatably supported on support cable 24 and separated by float members 23 threaded on support cables 24 vertically and horizontally movably supported at their opposite ends between opposing tank side walls 25. While a sufficient number of flotation assemblies 21 are preferably provided to overly the open tank top in predetermined spaced relation from end-to-end of tank 19, only five assemblies 21 are shown in FIGS. 1B and 4.

Referring for the moment to FIGS. 4 to 7, the respective flotation assemblies 21, preferably including cables 24 of ½" diameter non-stretch, inert-type, stranded or non-stranded rope or line, are assembled to provide alternate assemblies 21 having oppositely related porous body elements 22 and float members 23 as will be apparent from an inspection of the three cables shown at the left end of FIG. 4. Elements 22 and member 23 are respectively formed in generally cylindrical and barrel-like shapes having axial through bores (not shown) extending from end-to-end and dimensioned to freely pass the support cables 24.

The assembly of flotation assemblies 21 is accomplished by alternately sliding porous body elements 22 and float members 23 endwise onto support cables 24 in sufficient number to substantially enclose each cable length except for a sufficient length at each end to enable the opposite cable ends to be fixedly connected to a swaged rope lock 31 (FIGS. 5 and 6) having a threaded connector shank 32. The overall length of each of the flotation assemblies 21, together with its rope lock 31, is substantially less than the distance between the opposite tank walls 25 for a purpose which will presently appear. Each of the porous body elements 22 is composed of light weight porous material that is conducive to bacterial growth, for example, coke, and buoyancy of the material employed for float members 23 is precalculated to assure an overall buoyancy of each flotation assembly 21 which will sustain each porous body element 22 and float member 23 partially submerged (approximately 50%) in the liquid mix or tankage in filled tank 19 when installed.

Figure 5:
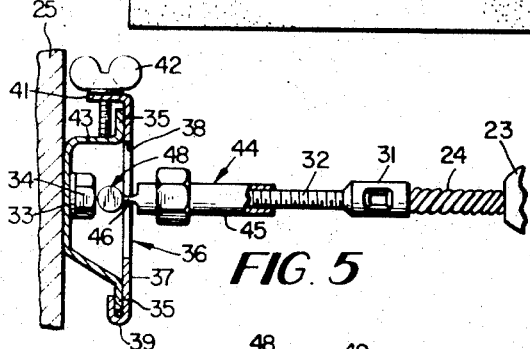
FIG. 5 is an enlarged detail of one end of one of the support cables employed to support the supplementary aeration equipment provided by this invention illustrating the means provided to floatingly connect the support cable to the tank side walls.
Figure 6:
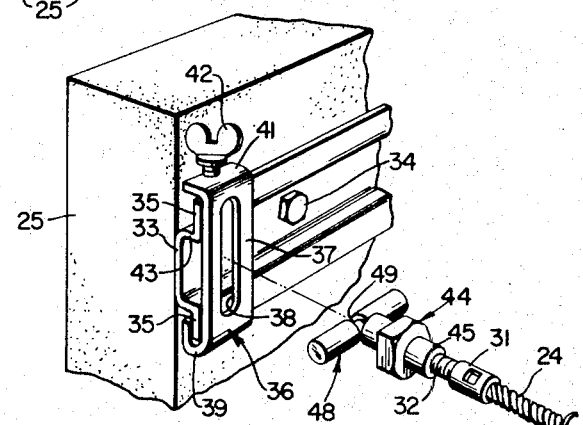
FIG. 6 is a fragmental perspective view further illustrating the means employed to floatingly connect the support cable to the tank side walls.

To mount the flotation assemblies 21 to accommodate normal depth variations of the tankage in tank 19 during operation due to the rising and falling surface contour of the flowing agitated tankage, the opposite ends of flotation assemblies 21 are preferably secured to the opposite tank walls 25 against horizontal movement but for free vertical movement. To this end, each tank side wall 25, below its upper edge at the approximate designed level of the upper surface of the tankage during operation, is fitted with a longitudinally coextensive support rail 33 (FIGS. 5 and 6). Each rail 33 takes the form of an elongated channel member bolted at spaced intervals 34 to side walls 25 and formed with oppositely outwardly directed flanges 35. Each support rail 33 is fitted with releasable slide clamps 36 (FIGS. 5 and 6), equal in number to the number of flotation assemblies 21. Each clamp 36 includes a body portion 37 vertically slotted at 38. Each slide clamp 36 is provided at its lower end with a return bent portion 39 to receive the lower rail flange 35 and at its upper end with an inturned flange 41 through drilled and tapped to receive a wing bolt clamp screw 42 located to bearingly engage its free shank end with the upper rail side wall 43 to lock each slide clamp in adjusted position along rail 33. The rope locks 31 at the respective opposite ends of each flotation assembly 21 are adapted for connection to respective opposed pairs of slide clamps 36 through a generally T-shaped nut and pin assembly 44 detailed in FIG. 7.

Figure 7:
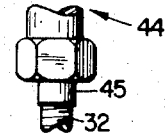
FIG. 7 is an exploded view, partially in section, illustrating the adjustable end connector means provided by this invention to permit proper tensioning and ready connection and disconnection of the support cables to the rail supported slide clamps provided to adjustably position the support cables along the sludge tank side walls.

As will be clear from FIG. 7, each of these assemblies 44 comprises a tubular nut portion 45 open at one end and internally tapped to threadedly receive shank 32 of a respective rope lock 31. The opposite end of nut portion 45 is necked in to provide a reduced diameter, axially directed, spindle-like portion 46 terminating at its free end in a laterally truncated ball connection formation 47 (FIG. 7). Assembly 44 is completed by a laterally directed, two part, retainer pin 48 of a length less than the length of slot 38 of slide clamp 36 but sufficient to laterally span slot 38. Retainer pin 48 midway of its end is formed with an annular peripherally opening groove 49 undercut into its opposing faces to define in cross section respective segmented spherical concavities 52 for matingly journalling the spherical surface of the truncated ball connection formation 47. As best shown in FIG. 7, two part retainer pin 48 comprises a first member 51 having a cylindrical main body portion the undercut end face of which radially inwardly of groove 49 is formed to provide a reduced diameter, axially directed, externally threaded shank portion 53 of a length exceeding the length of the main body portion of member 51 by a distance slightly less than the spherical diameter of ball connection formation 47 and a second cylindrical nut member 54. Nut member 54 is the same length as member 51, its end face opposing the undercut end face of member 51 is similarly undercut to complete annular groove 49, and it is axially through bored and tapped to threadedly receive threaded shank 53 of member 51. When threaded home onto shank 53, the opposing recesses 52 of member 51 and 52 journallingly engage the spherical wall segment of truncated ball connection element 47 in overlapping relation to the oppositely directed planar faces of ball connection element 47 thereby fixing nut portion 45 against radial movement relative to retainer pin 48. Preferably a light bearing engagement is established between ball connection element 47 and recesses 52 by inward threading of nut body 54 along shank 53 to form a swivel connection. This light bearing engagement is permanently established by setting set screw 57 carried by nut body 54 against shank 53. As a result of this novel connection with slide clamps 36, the opposite ends of flotation assemblies 21 are connected to slide clamps 36 to permit free rising and falling of flotation assemblies 21 relative to slide clamps 36 and swivelling of flotation assemblies 21 relative to retainer pins 48. As a consequence, the flotation assemblies 21 are supported to freely follow both the rise and fall of the level of the tankage in tank 19 and free undulating flexing movement of cables 24 is assured permitting the flotation members 23 to follow the undulations of the exposed liquid surface of the agitated tankage maintaining the partially submerged relationship of the porous body elements 22. Furthermore, since the porous body elements 22 and float members 23 are freely associated with the cables 24, the conventional spiralling movement of the tankage relative to porous body elements 22 and float members 23 causes the latter to rotate relative to cables 24. This flow induced rotation produces a trickling filter effect over the entire upper surface of the tankage in tank 19, a wetting of the porous elements to encourage bacterial growth thereon which sluffs off into the tankage and a dripping and splashing effect over the interface of the tankage and ambient air to increase the incorporation of air into the tankage, materially increasing the exposure of the tankage to the air and light and effecting a provable 38% increase in the B.O.D. (biochemical oxygen demand) removal efficiency over the conventionally fitted activated-sludge processing plants. The effluent from tank 19 then overflows through discharge pipe 61 into settling tank 62 (FIG. 1B) of conventional construction where the sludge settles out and the liquid component, water with as much as 98.8% B.O.D. removed, overflows into the peripheral trough 63 formed within the upper region of the side walls of settling tank 62. This overflowing liquid component, instead of being directly recycled into the water resources of the urban area seved by the plant as presently is done, is discharged through pipeline 64 into the multichannel trough 65 of a greenhouse garden 66 (FIG. 1C) to serve as a nutrient liquid for the growing of plants having commercial value. To this end, the garden 66 is formed by an elongated concrete base structure 67 having respective upstanding end walls 68, 69 and upstanding side walls 71, 72 defining a generally rectangular, open topped, chamber divided by upstanding partition walls 73 integrally joined to end wall 68 and terminating short of end wall 69 and alternately directed partition walls 74 integrally joined to end wall 69 and terminating short of end wall 69 and alternately directed partiton tichannel trough 65 end 75 of which is apertured at 76 to receive the discharge end of pipeline 64 and end 77 of which is apertured at 78 to receive the entrance end of a pipeline 79 provided to convey the resulting nutrient free, potable water end product into the community water resources.

To effectively extract the nutrients from the circulating nutrient rich liquid component introduced into trough 65 through pipeline 64, the trough 65 is dimensioned lengthwise and crosswise to accommodate the full inflow from pipeline 64 while maintaining a liquid level in each channel of trough 65 as indicated by the dot-dash line of FIG. 3. To assure continuous through fluid flow along trough 65 and to support the growing plants, the respective trough channels are provided with a false bottom wall composed of respective longitudinally spaced, staggered rows of inverted arcuate tiles 81 (FIGS. 1C and 3) defining a through flow path for the nutrient rich liquid and a floor base for supporting a first aggregate layer 82 (FIG. 3) through which the plant roots grow to penetrate downwardly into the flowing nutrient rich liquid and an upper strata 83 of inert material, such as peat moss, providing a plant growth and support media. The plants, designated in FIG. 3 by the letter P, may be any commercially desirable plant, ornamentals for landscaping or garden plants, for example beans, peas, tomatoes, corn, or other food plants producing above ground edible vegetables and fruit which will not directly contact the nutrient rich liquid in its passage along trough 65. The roots of such plants penetrating the rock layer will enter into the flowing liquid and extract the growth promoting nutrients and needed moisture in constant available supply to assure plant and fruit growth of maximum high quality. At the same time, the nutrients will be removed from the passing liquid leaving, in a properly designed and controlled gardening operation, nutrient free water to be recycled into the community's natural water resources. To provide a constant monitoring system to test the thoroughness of nutrient removal before the garden effluent is recycled, the present invention contemplates that the terminal run 101 of garden 66 be in the form of an algae bed. This plant, a self-propogating species in bodies of water containing nutrients, provides an excellent indicator and test media for determining the efficiency of the garden 66 and, when provided as preferably contemplated by this invention with automatic harvesting equipment of known construction (not shown), provides a constant indication of the presence or absence of nutrients in the garden effluent. If growth of the algae occurs, the addition of commercial plants or enlargement of the garden of a particular installation can be undertaken to assure the requisite nutrient removal capacity of the garden.

While the actual commercial operation of the gardens may not fit into the normal sphere of operations of the municipal authorities, the gardening rights could be leased to private enterprises or operated by welfare authorities and charitable organizations to provide jobs for the unemployed and food for the poor and institutions operated by the municipal authorities. In this way the municipalities involved could secure, in addition to the ecological disposal of waste products which places a burden on municipal funds and ingenuity, a substantial monetary return to offset in part, at least, their financial burden in disposing of accumulating urban wastes.

The present invention further contemplates a thoroughly practical disposal of the waste sludge which accumulates in settling tank 62. This waste sludge is pumped from tank 62 by means of pump 91 (FIG. 1B) and a portion thereof is recirculated through pipeline 92 back to the aeration tank 19 in conventional manner as "return sludge," a catalyst, to maintain optimum operation of the system.

The remainder of the waste sludge is delivered by pump 91 through pipeline 93 and filter 94 either to a drier schematically illustrated by box 95 (FIG. 1B) where it is dried in well known manner and converted to commercial fertilizer for packaging and marketing or preferably to a spray distribution means 96 (FIG. 8) for on the site use as will now be described.

As previously pointed out, the present invention also contemplates disposing of organic yard and street waste in the form of heavy tree and bush prunings which are presently for the most part disposed of in landfills or incinerated with incident pollution of the air by smoke and acrid combustion fumes. These waste materials being incapable of ready grinding and disposal as a part of the influent treated in the activated-sludge process previously described, will be collected and trucked to the plant site. They will be initially dumped into a feeder bin of a conventional wood chipper, for example, a machine of the type illustrated in U.S. Letters Pats. 2,869,793 and 3,473,742, issued respectively Jan. 20, 1959, and Oct. 21, 1969, to W. T. S. Montgomery, fitted with a screen designed to provide fine ground chips (not shown). The resulting wood chip output of these machines will be spread out over a bed area 97 on the ground to a depth of several inches beneath a series of pipelines 98 fitted with suitable spray heads 99 intermittently operated to soak the chips with the wet activated-sludge return waste. The soaked chips are then turned into the earth with bulldozers and again sprayed with the return waste sludge and turned in repeatedly over over a period of a few days until the composting mixed material analyzes to a ten to one ratio of carbon over nitrogen. Such a compost, produced in the matter of days due to the decomposing effect of the waste sludge as compared to the normally months of time for composting such pruning wastes in landfill operations, produces the richest soil that can be obtained. This composted soil is readily marketable when air dried and bagged for home gardening and landscaping usage enabling the municipality to secure further income from its waste removal operations to meet the cost of the ecological disposal operation with minimal cost to the taxpayer.

While this last mentioned method of disposing of the remainder of the waste activated-sludge necessitates that a substantial ground area be available for composting beds, an alternative means of composting the wood chips would be to feed the chips together with the waste activated-sludge into a revolving drum (not shown) to effect the rapid decomposition of chips. This alternative would be a solution to the disposal problem where the municipality lacked the funds to purchase the expensive drying equipment required to convert the waste sludge to commercial fertilizer or lacked the ground area and/or bulldozer equipment to effectively operate composting beds.

It will be appreciated from the preceding description that the method and apparatus provided by this invention provides an activated-sludge treatment process for the substantially complete disposal of urban sanitary, household, and yard and garden wastes which eliminates the need for preliminary-sedimentation tanks, final sedimentation digesting tanks, and the need for properly disposing of excess sludge.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. A method of disposing of urban waste matter through the utilization of activated sludge, sanitary sewage treatment plants comprising the steps of grinding the organic kitchen waste, yard and garden trimmings and trash to produce a comminuted solids residue; introducing the comminuted solids residue into the flowstream passing through the sanitary sewage lines to be conveyed along with the sanitary sewage solids to the treatment plant as a combined effluent; introducing the combined effluent into conventionally fitted aeration tank means modified to provide supplemental aeration sufficient to biochemically decompose the solids and form a mixed liquor effluent rich in plant nutrients; introducing the mixed liquor effluent into a settling tank means to effect in conventional manner a settling of the activated sludge and an effluent liquid discharge; pumping the activated sludge from the settling tank means along respective paths to return a portion of the sludge to said aeration tank means to serve as an aeration catalyst and to direct the excess sludge for further processing to convert it to use as plant food; and conveying the effluent liquid discharge containing dissolved plant nutrients through a plant propagation garden as a source of plant food and watering media to effect removal of the nutrients and provide a final effluent of substantially nutrient free water for discharge into environmental water resources.

2. The method of claim 1 wherein the excess sludge is further processed by passing it through conventional drying means to produce a commercial dry fertilizer usable as farm and garden fertilizer.

3. The method of claim 1 including the further steps of delivering yard and garden prunings to a wood chipper at the plant site; broadcasting the resulting wood chip output of the wood chipper on ground areas adjacently related to the settling tank means to form beds of said wood chips; alternately spraying the excess wet sludge onto the chip beds and turning it along with the chips into the earth; and maintaining the turned-in chips, sludge and earth in intimate contact for several days while keeping the mix wetted with excess sludge thereby effecting rapid composting of the chips and production of an exceedingly rich earth compost usable for farm and garden enrichment.

4. The method of claim 1 wherein the supplemental aeration is effected by floatingly supporting freeably rotatable porous body elements over substantially the entire surface area of the aeration tank contents whereby the normal circulation of the tank contents will effect wetting and rotation of the porous body elements thereby effecting a surface splashing agitation of the tank contents whereby effective exposure of the porous body elements and the resulting splash to the ambient air and light at the interface is assured providing an increased aeration of the tank contents and a bacterial growth on the exposed surfaces of the porous elements which sluffs off into the tankage to increase the aerobic bacterial content of the tankage.

5. An activated sludge waste treatment plant for effectively disposing of urban waste matter comprising means for grinding household garbage and other organic waste materials including yard and garden trimmings for introduction into the sanitary sewage lines; conventionally fitted sanitary sewage lines maintaining a constant liquid flow from the various households to the sewage treatment plant; means for introducing the ground household garbage and organic waste material into said sewage lines to be conveyed along with the sanitary sewage to the treatment plant; a conventionally fitted activated sludge aeration tank arranged to directly receive as an influent the combined effluent discharge from said sanitary sewage lines; supplementary aeration means arranged to increase the aeration and bacterial growth of the tankage of the conventionally fitted activated sludge aeration tank by incorporating a trickling filter effect in the conventionally fitted activated sludge aeration tank; a settling tank arranged to receive the mixed liquor from said activated sludge aeration tank and effect a settlement of the sludge and an overflow of the nutrient rich liquid; a plant propagation garden including means for conveying the nutrient rich liquid overflow therethrough to serve as a root assimilated source of plant food and watering media, the plants in said plant propagation garden effecting removal of the nutrients and providing a final effluent in the form of nutrient free, potable water for recycling into the community water resources.

6. The activated sludge waste treatment plant of claim 5 wherein said supplementary aeration means comprise a multiplicity of string-like flotaiton assemblies arranged in side-by-side spaced relation upon the surface of the tankage in a conventionally fitted activated sludge aeration tank, each assembly comprising a support cable the opposite ends of which are vertically slidingly supported by opposing tank side walls and the cable portion between said ends is fitted with freely rotatable porous body members interspersed between float sustaining members to maintain said porous body members partially submerged in the tankage at the interface with the ambient air, said porous body members being free to rotate relative to the support cable under influence of the spiralling flow of the tankage to wet the porous body members and impart to the tankage surface a splashing effect to expose droplets of the tankage and the wetted porous body members to intimate surface contact with the ambient air and light thereby enhancing the incorporation of ambient air into the tankage and promoting the growth of aerobic bacteria on the porous body members to be sluffed off into the tankage due to the relative movement between said porous body members and the tankage.

7. The activated sludge treatment plant of claim 6 wherein the opposite ends of said support cable are respectively provided with a swagged rope lock member including a threaded shank coaxially related to said respective cable ends, a generally T-shaped nut and pin assembly including a swivelling connection between said nut, which is threaded onto said threaded shank, and said pin, which extends at right angles to the axis of said threaded shank and the opposing tank side walls fixedly mount at the normal surface level of said tankage respective longitudinally extending support rails and respective slide clamps having vertically directed slots are releasably secured in opposed relation along said support rails to vertically slidingly receive the portion of said nut immediately adjacent said swivel connection to said pin with said pin laterally spanning said slot whereby said cable ends are vertically slidably secured to said opposing tank side walls.

8. The activated sludge treatment plant of claim 7 wherein said respective support rails comprise a generally channel-shaped elongated member the respective side walls of which protrude inwardly from said tank side walls and are formed along their free edges with oppositely outwardly directed flanges and the respective web forming walls of which are bolted in face abutting relation to said opposing tank side walls and said slide clamps comprise respective plate members elongated in the direction of the major axis of said slot to span said channel members at right angles with one end formed with a return bent flange slidably receiving one flange of an associated support rail and the other end formed with a right angular directed flange disposed to overlie and extend beyond the other flange of the associated support rail and formed with a tapped through passage and a clamp screw threaded through said tapped through passage into abutting engagement with the oppositely related channel wall to fixedly secure the respective slide clamps in preselected spaced relation along said support rails.

9. The activated sludge treatment plant of claim 6 wherein said porous body members of adjacently related string-like flotation asemblies are alternately staggered to lie opposite the float sustaining assemblies thereby assuring substantially full area disturbance of the tankage interface.

10. The activated sludge waste treatment plant of claim 5 wherein said plant propogation garden comprises a generally parallel sided ground area having a trough-like, open topped passage therein extending from an entrance end at one side adjacent a corner of the ground area longitudinally toward the opposing side of the opposite side of the ground area to a return bend portion adjacent the opposing side and continuing in this fashion to define respective laterally spaced trough-like runs joined at adjacent ends by return bend portions throughout the ground area to a discharge end; respective inlet and discharge pipelines respectively connected to receive the nutrient rich overflow from said settling tank and discharge the nutrient free water into the community water resources; a series of inverted arcuate cross-sectioned liners disposed in end spaced relation along said trough-like passage to define a through flow path along said trough-like passage; a first layer of coarse stone-like consistency overlying said liners to permit ready penetration of the root systems of growing plants; and an upper strata of inert material defining a plant growth and support media for selected growing of ornamental and food plants of commercial value.

11. The activated sludge waste treatment plant of claim 5 wherein the means for grinding household garbage and other waste materials comprise kitchen sink-type disposal units connected to discharge into the sanitary sewage lines.

12. The activated sludge waste treatment plant of claim 5 wherein the means for grinding household garbage and other waste materials comprise a screw conveyor receiving bin and grinder unit located at a trucking disposal site connected to discharge into the sanitary sewage lines.

13. The activated sludge waste treatment plant of claim 5 wherein said settling tank is conventionally fitted with a sludge pump having dual outlets one of which is connected through a return line leading to the aeration tank to deliver a portion of the pumped sludge thereto to serve as a catalyst for maintaining bacterial activity in the aeration tank and drying means is provided and connected to the other pump outlet to receive the remainder of the pumped sludge and dry it for packaging and use as commercial fertilizer.

14. The activated sludge waste treatment plant of claim 5 wherein said settling tank is conventionally fitted with a sludge pump having dual outlets one of which is connected through a return line leading to the aeration tank to deliver a portion of the pumped sludge thereto to serve as a catalyst for maintaining bacterial activity in the aeration tank and spray means is provided and connected to the other pump outlet to receive the remainder of the pumped sludge and spray it onto preformed ground supported beds of wood chips provided by chipping yard, garden and street side tree and bush prunings to serve as a composting catalyst for decomposing the wood chips when repeatedly sprayed and turned into the ground over a period of days to produce a commercial humus for yard and garden usage.

References Cited

UNITED STATES PATENTS

| | | | |
|---|---|---|---|
| 3,655,046 | 4/1972 | Trussell | 210—11 |
| 3,575,849 | 4/1971 | Torpey | 210—17 X |
| 3,462,360 | 8/1969 | McKinney | 210—14 X |
| 2,222,310 | 11/1940 | Emery | 210—2 X |
| 3,598,726 | 10/1971 | Welch | 210—17 X |

FOREIGN PATENTS 730,917 5/1932 France.

MICHAEL ROGERS, Primary Examiner

U.S. Cl. X.R.

71—9, 13, 23; 210—10, 17, 152, 195